(12) United States Patent
Liedtke

(10) Patent No.: US 11,673,235 B2
(45) Date of Patent: Jun. 13, 2023

(54) PLIERS

(71) Applicant: KNIPEX-Werk C. Gustav Putsch KG, Wuppertal (DE)

(72) Inventor: Tim Liedtke, Solingen (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 427 days.

(21) Appl. No.: 17/050,222

(22) PCT Filed: Apr. 25, 2019

(86) PCT No.: PCT/EP2019/060597
§ 371 (c)(1),
(2) Date: Oct. 23, 2020

(87) PCT Pub. No.: WO2019/207033
PCT Pub. Date: Oct. 31, 2019

(65) Prior Publication Data
US 2021/0101260 A1   Apr. 8, 2021

(30) Foreign Application Priority Data
Apr. 26, 2018   (DE) .................. 10 2018 110 106.6

(51) Int. Cl.
*B25B 7/14*   (2006.01)
*B25B 7/08*   (2006.01)
*H02G 1/12*   (2006.01)

(52) U.S. Cl.
CPC ............... *B25B 7/14* (2013.01); *B25B 7/08* (2013.01); *H02G 1/1212* (2013.01)

(58) Field of Classification Search
CPC .... B25B 7/22; B25B 7/14; B25B 7/02; B23D 29/02; B23D 29/023; B23D 33/02; B23D 33/04; H01R 43/042; H01R 43/0421; H02G 1/005; H02G 1/12; H02G 1/1236;
(Continued)

(56) References Cited

U.S. PATENT DOCUMENTS 6,588,039 B1 *   7/2003   Bates ...................... B25B 7/02
7/107

FOREIGN PATENT DOCUMENTS

| DE | 10 2010 000 558 A1 | 8/2011 |
| DE | 10 2011 052 926 A1 | 11/2012 |
| DE | 20 2017 107 442 U1 | 12/2017 |

OTHER PUBLICATIONS

International Search Report of PCT/EP2019/060597, dated Aug. 5, 2019.

* cited by examiner

*Primary Examiner* — Robert J Scruggs
(74) *Attorney, Agent, or Firm* — Collard & Roe, P.C.

(57) ABSTRACT

A pair of pliers has a first and a second plier leg, which are mounted so as to be rotatable relative to one another in a joint region and which form gripping regions on one side of the joint region and a plier jaw on the other side. A locking part fixes position of the pliers. The locking part is rotatably mounted on the first plier leg at a transition between the gripping region and the joint region of the plier leg, and, in the fixed position, fixes the pliers by contact with the joint region of the second plier leg. The locking part, in the fixed position and under load, is in supporting contact both with the joint region of the second plier leg and with the gripping region of the first plier leg in a plane perpendicular to the axis of rotation of the plier legs.

10 Claims, 12 Drawing Sheets

(58) Field of Classification Search
CPC .... H02G 1/1239; H02G 1/1246; B21F 1/002; B21F 1/003; B26B 17/00
See application file for complete search history.

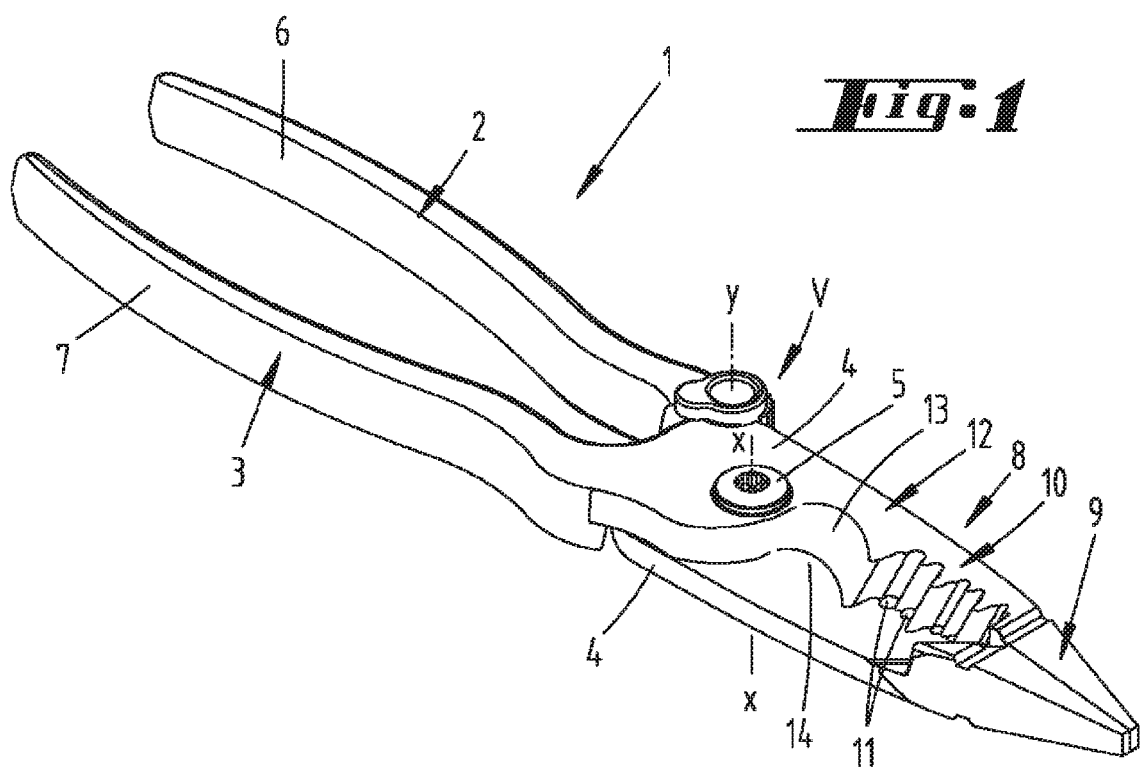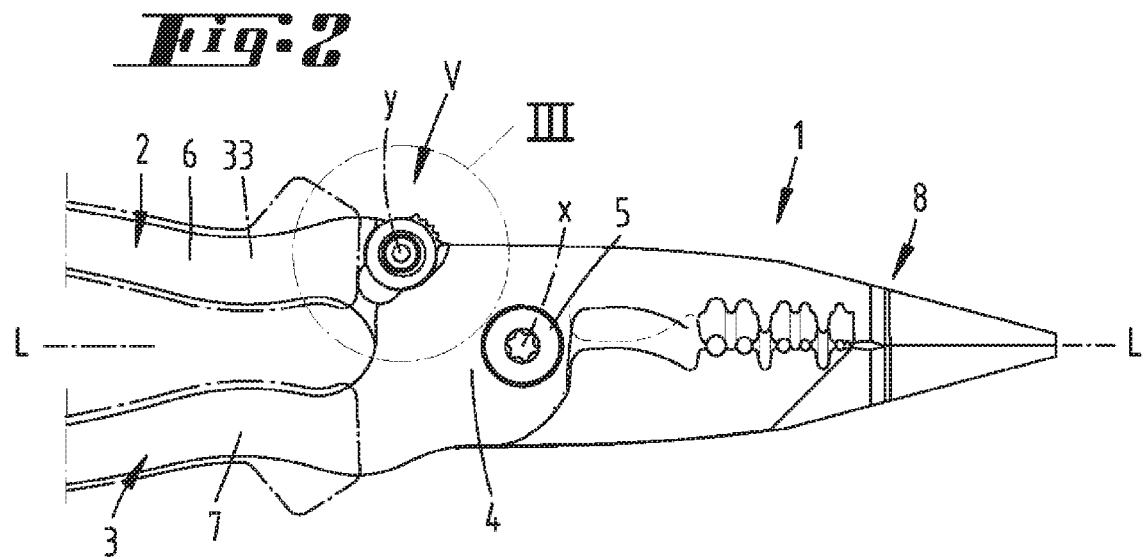

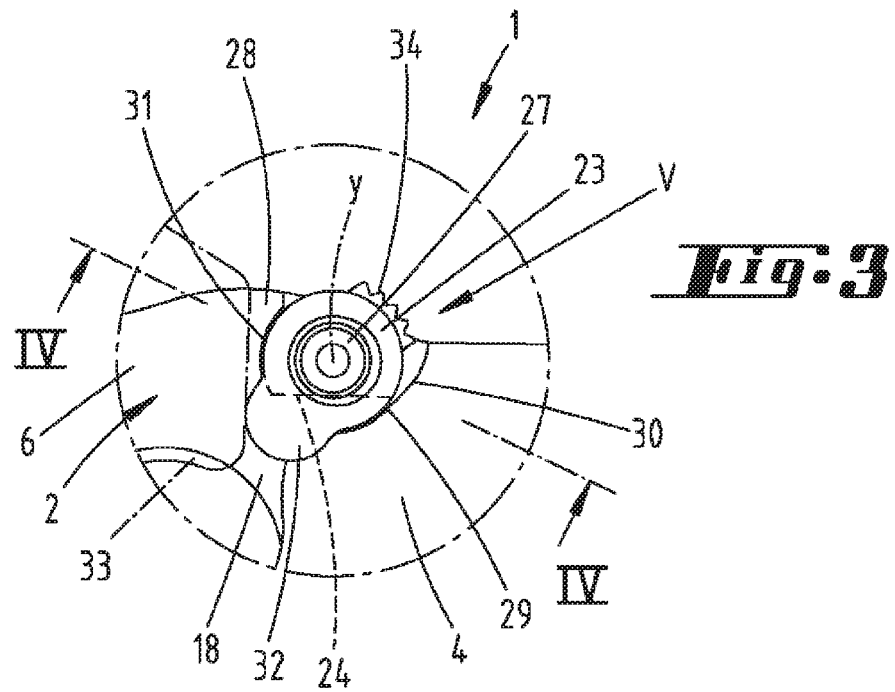
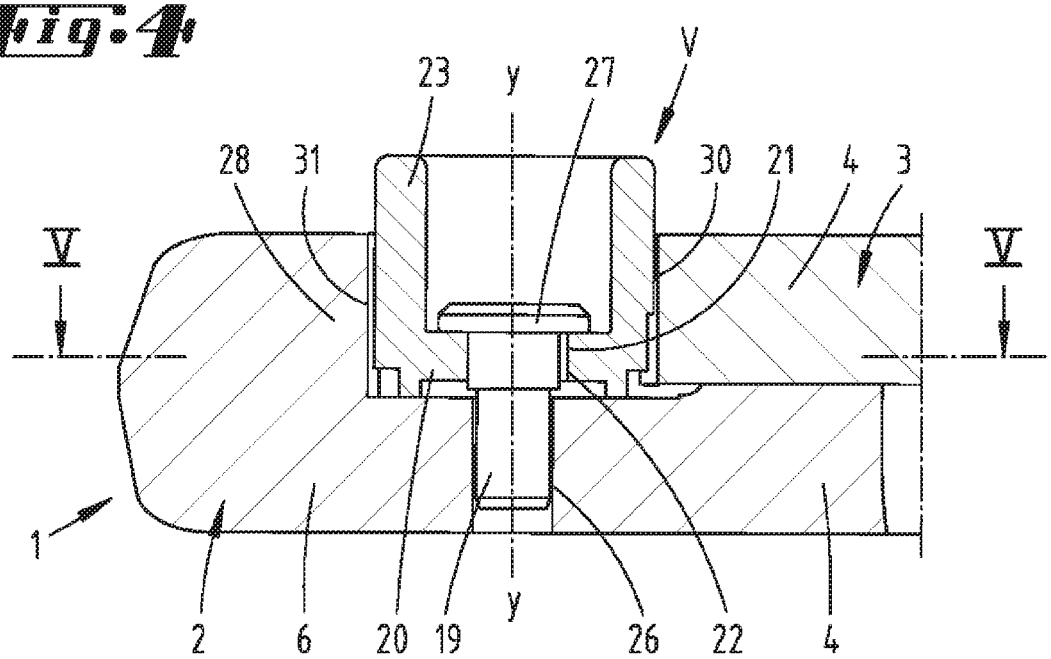

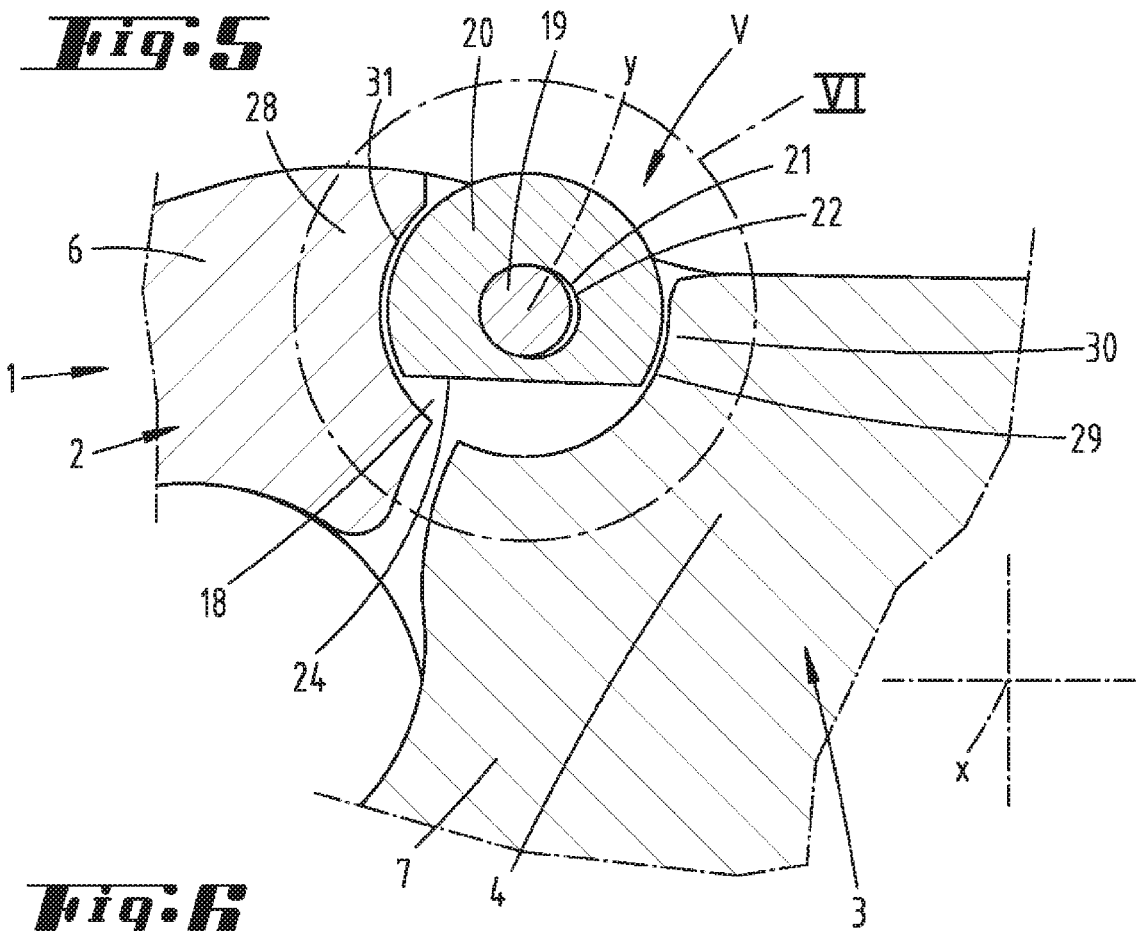
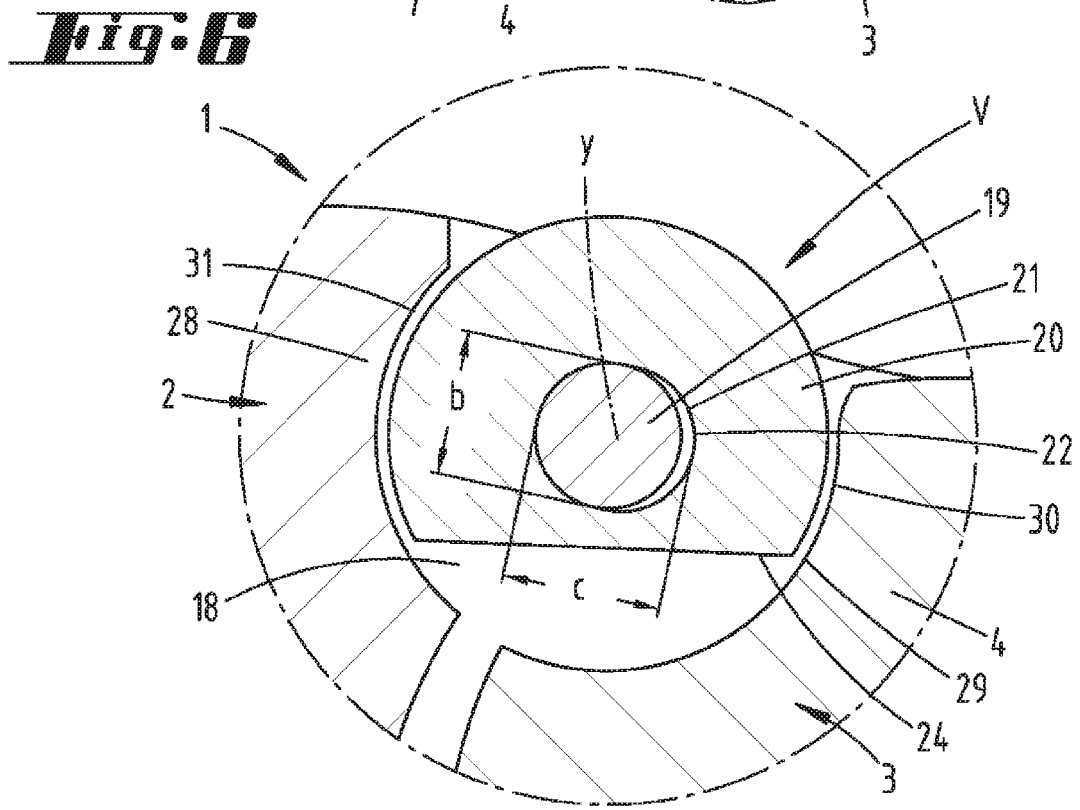

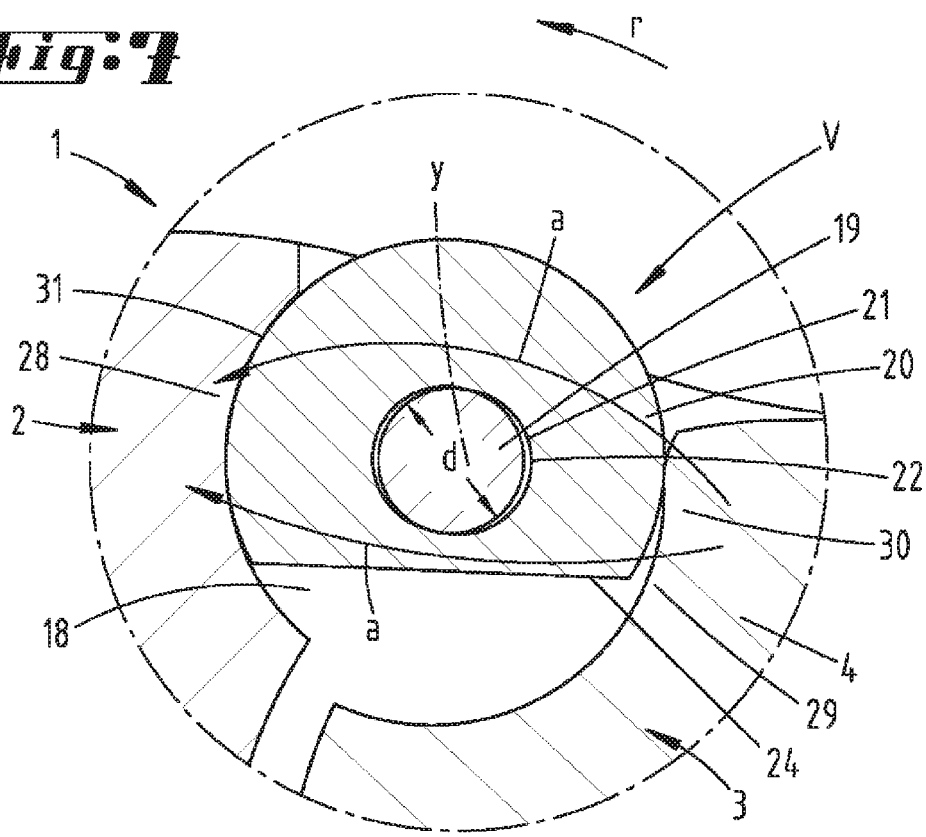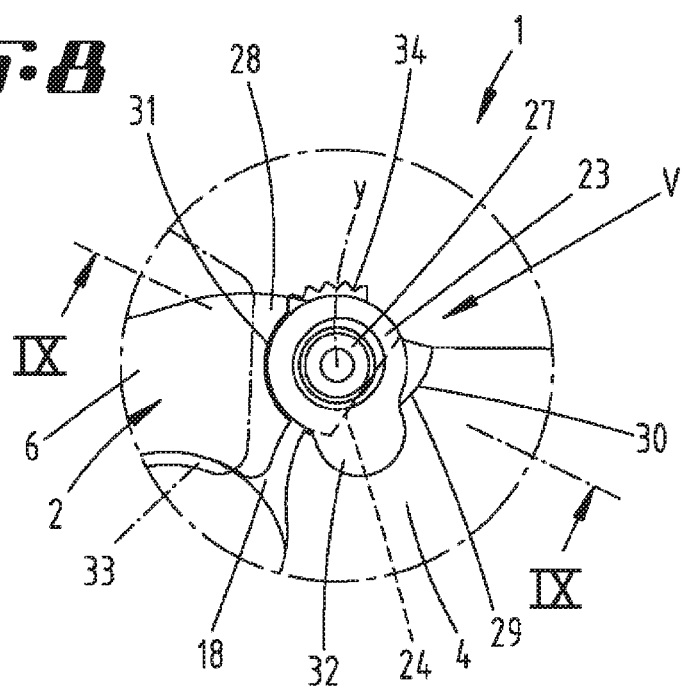

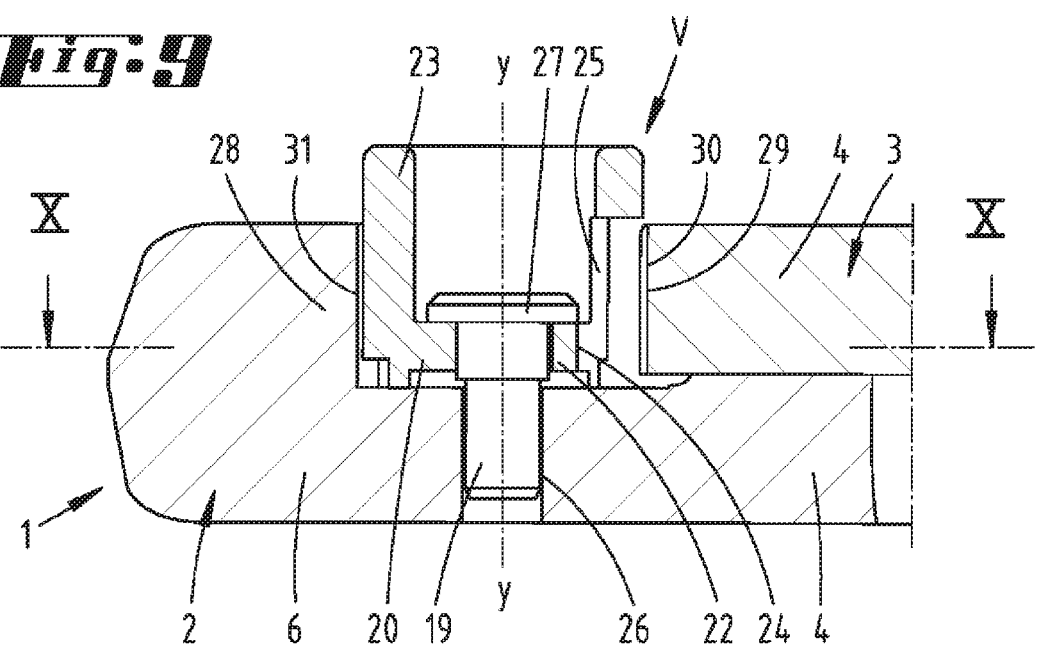
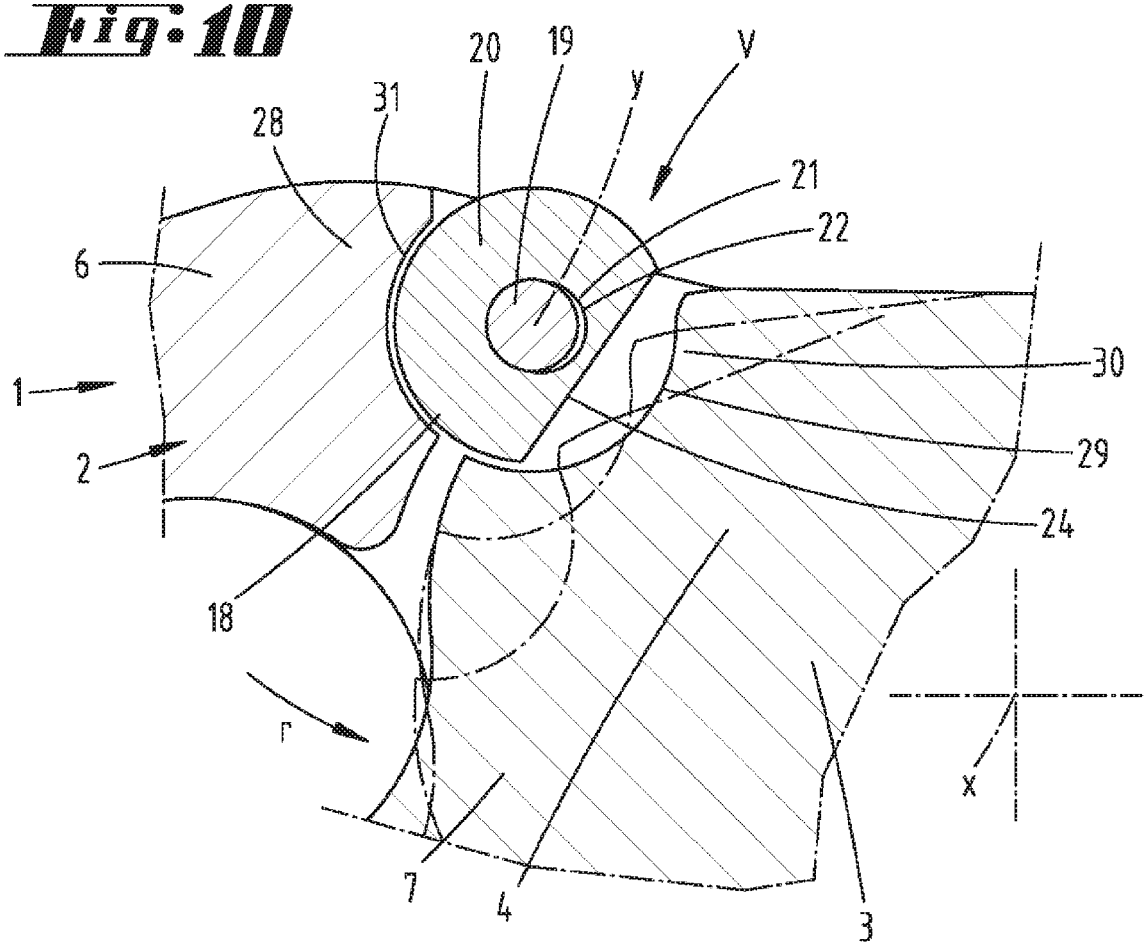

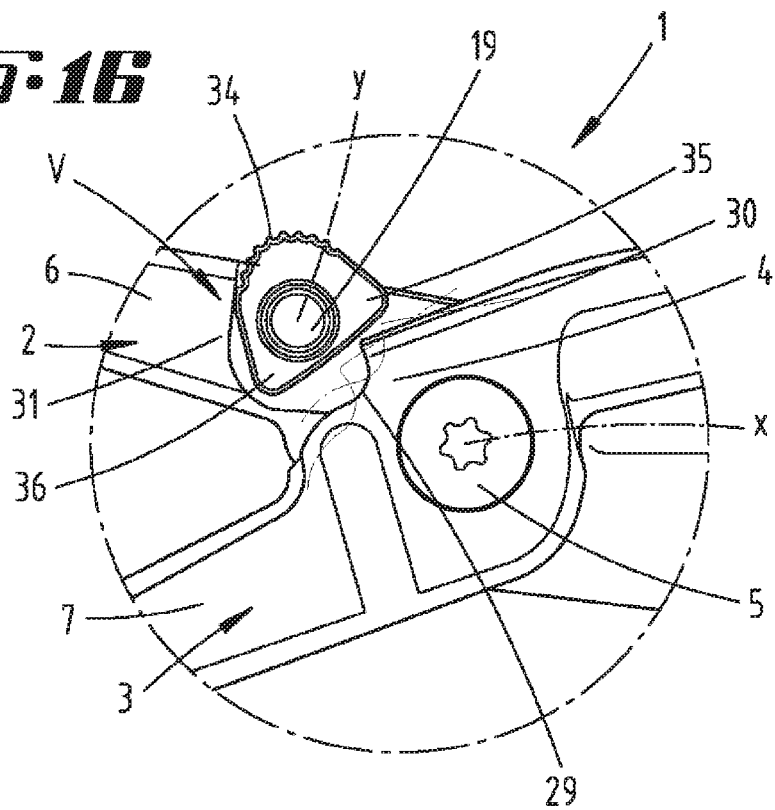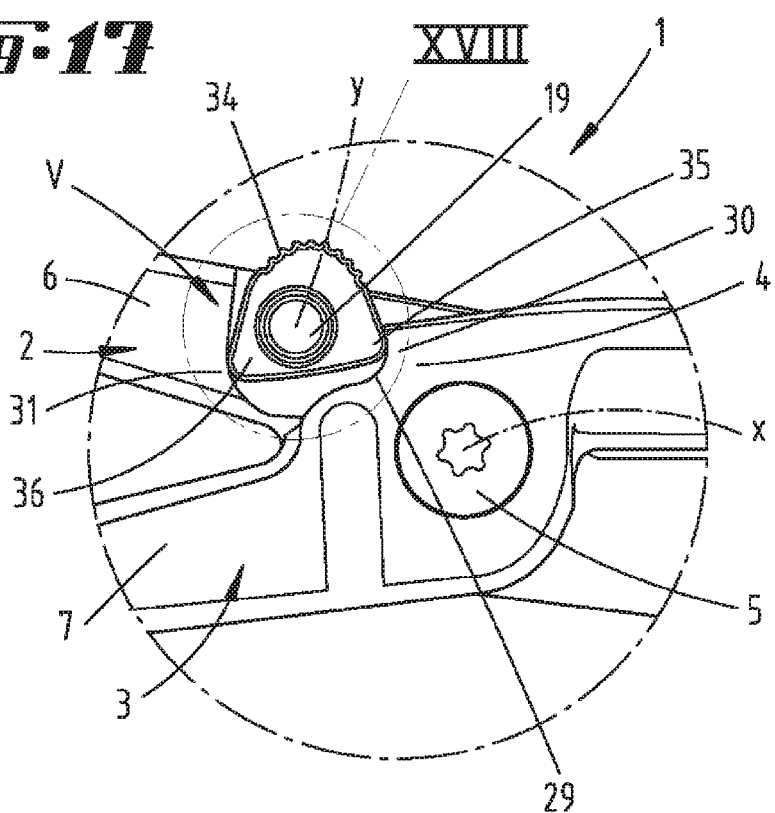

PLIERS

CROSS REFERENCE TO RELATED APPLICATIONS

This application is the National Stage of PCT/EP2019/060597 filed on Apr. 25, 2019, which claims priority under 35 U.S.C. § 119 of German Application No. 10 2018 110 106.6 filed on Apr. 26, 2018, the disclosure of which is incorporated by reference. The international application under PCT article 21(2) was not published in English.

TECHNICAL FIELD

The invention pertains to a pair of pliers with a first and a second plier leg, which are mounted so as to be rotatable relative to one another about an axis of rotation in a joint region, wherein said plier legs form gripping regions on one side of the joint region and a plier jaw on the other side, wherein a position of the pliers, typically a closed position, can be fixed by means of a locking part, and wherein the locking part furthermore is rotatably mounted on the first plier leg at a transition from the gripping region to the joint region of this plier leg and in the fixed position fixes the pliers by contacting the joint region of the second plier leg.

PRIOR ART

Pliers of the type in question are known in different variations, e.g. in the form of gripping pliers or also in the form of cutting pliers or cutting shears. As an example, we refer to DE 10 2011 052 926 A1 in this respect. This patent application discloses a multifunctional pair of pliers that has different cutting and gripping regions in the region of the plier jaw, wherein the plier legs of this pair of pliers can be fixed at least in one position, particularly the closed position, by means of a locking part. The locking part is pivotably arranged in a region of the first plier leg near the joint, wherein the corresponding pivoting axis is oriented in the same direction as the geometric axis of rotation, about which the plier legs are rotatable. In the fixed position, the second leg is supported on the locking part by means of a locking surface formed in its joint region. The pivotability of the locking part is realized by means of a pivot pin fastened on the first plier leg.

SUMMARY OF THE INVENTION

In light of the above-described prior art, an objective of the invention can be seen in additionally enhancing a pair of pliers of the type in question, particularly with respect to the locking action.

According to a first inventive idea, this objective is potentially attained with a pair of pliers, in which it is proposed that the locking part is in the fixed position and in any case under load in supporting contact with the joint region of the second plier leg, as well as with the gripping region of the first plier leg, in a plane extending perpendicular to the axis of rotation of the plier legs.

As a result of the proposed solution, any forces acting upon the locking part in the closed and locked position of the pliers, e.g. during an attempted opening pivoting motion of the second plier leg relative to the first plier leg in the locked position, are directly transmitted into the gripping region of the first plier leg via the locking part. This is achieved by means of a preferably direct support of the locking part on the joint region of the second plier leg and on the gripping region of the first plier leg at least in such a position under load. In this context, it is preferred that the force application and the force transfer essentially take place in a plane that is oriented transverse to the axis of rotation of the plier legs, as well as transverse to the pivoting axis of the locking part, or in a series of planes that extend transverse to the axis of rotation and lie on top of one another in the direction of the axis of rotation, preferably in a thickness of the second plier leg resulting in the direction of the axis of rotation in its joint region, which is supported on the locking part.

The connecting region of the locking part on the first plier leg preferably remains unaffected by loads with respect to any shearing forces acting upon this connection. This counteracts the risk of a disengagement of the locking part or its withdrawal from the locking position by simply subjecting the locking part to a load via the plier legs.

Other characteristics of the invention are frequently described below, as well as in the description of the figures, in their preferred association with the object of claim 1 or with characteristics of other claims. However, they may also be important in association with only individual characteristics of claim 1 or the respective other claim or independently.

According to a preferred embodiment, regions, in which the contact takes place, can only be connected by a straight line that extends at a radial distance from the geometric pivoting axis of the locking part. The radial distance of the straight line from the pivoting axis may correspond to between one-twentieth and one-third, e.g. about one-tenth, of the length of the straight line between the contact regions. In this way, a torque can be applied to the locking part in the locking position via the contacting plier leg, wherein said locking part is (also) subjected to a load into the contact position on the other plier leg due to this applied torque. This advantageously assists in the direct transmission of forces, preferably into the gripping region of the first plier leg, via the locking part.

In this context, the locking part may according to another proposed embodiment be mounted on the pin forming the geometric pivoting axis without clearance. In this case, the locking part is freely rotatable about the pin at least over the required pivoting range between the locking position and the unlocking position. A motion in the direction extending transverse to the pivoting axis is not proposed, but may optionally take place within the range of conventional tolerances of rotary bearings.

In another preferred embodiment, the locking part may be rotatably mounted on the first plier leg by means of a pin. In the interacting region with the locking part, in particular, this pin may have the shape of a circular cylinder, but may also be realized in the form of a polygonal pin.

A rotary receptacle of the pin preferably is realized with an oversize that in the fixed position allows the aforementioned supporting contact with the joint region of the second plier leg and, under load, simultaneously with the gripping region of the first plier leg. Accordingly, a clearance is formed in the region of the rotary receptacle of the pin in order to allow a motion of the pin relative to the section forming the rotary receptacle.

In a potential embodiment, the rotary receptacle is realized in the form of an oblong hole with a transverse extent that essentially is adapted to the diameter of the pin and a longitudinal extent that corresponds to a multiple of the pin diameter.

For example, a maximum clear length of the oblong hole may correspond to between 1.1-times and 1.5-times, e.g. between 1.15-times and 1.2-times, a maximum diameter dimension of the pin.

In a potential embodiment, the pin may be formed on the first plier leg and the rotary receptacle may be formed on the locking part. Accordingly, the pin is in such an embodiment fixed on the first plier leg, e.g. by means of riveting or screwing. The locking part has the rotary receptacle, e.g. in the form of an oblong hole, through which the pin extends.

The locking part may in a cross section also be realized in a pot-shaped manner and the pin may extend through a pot base. The pot base may be arranged such that it faces the facing flat side of the first plier leg, wherein the rotary receptacle, which is optionally realized in the form of an oblong hole, is in a potential embodiment formed in the pot base.

A head of the pin, which corresponds to the end of the pin lying opposite of the end on the fastening side on the first plier leg, may be arranged in the locking part in a sunk manner and accordingly is preferably surrounded by the pot wall that optionally extends over the entire circumference, but may in a potential embodiment also extend over only part of the circumference.

With respect to its outer contour, the locking part may also be realized in an essentially circular manner in an axial region, in which it can come in supporting contact. The pot wall sections that in the locking position come in supporting contact with the joint region of the second plier leg and with the gripping region of the first plier leg are with respect to their outer contour preferably formed along a section of a circular arc. In the supporting contact position (locking position), in particular, their geometric center may respectively lie on the geometric pivoting axis of the locking part or on the geometric longitudinal axis of the pin.

The locking part may also be provided with a flattening in the region with a circular outer contour. This flattening defines an unlocking region for releasing the rotation of the second plier leg. In order to unlock the pliers, the locking part is pivoted about its pivoting axis in such a way that the flattening in the outer contour is associated with the joint region of the second plier leg and thereby releases its pivoting path.

The flattening may transform into a recess formed in the pot wall. This recess may be realized in the form of a region of the pot wall that is cut open. Furthermore, the recess may be realized in the form of a window.

The locking part may also form a stop section that is directed toward the inner side of the handle and extends above the region of the supporting contact in the locking position. The stop section may interact with a plier section in order to form a defined stop of the locking part. For example, the stop section may extend radially outward beyond the pot wall of the locking part referred to the pivoting axis of the locking part, for example, with a free projection that corresponds to between 0.3-times and 0.7-times, e.g. 0.5-times, the pot diameter.

In a potential embodiment, the stop section may be designed for limiting a rotation of the locking part into the fixed position of the pliers. Furthermore, it may also limit a rotation of the locking part into the release position of the pliers. In a potential embodiment, such a limitation may be realized by means of an additional stop region on the locking part, which is provided on the outer side of the pot wall and in a top view of the locking part, in which the pivoting axis of the locking part is illustrated in the form of a point, essentially arranged diametrically opposite of the above-described stop section. For example, a handling region that can be used for pivoting the locking part may also be used for this purpose.

The stop section may be designed for interacting with the first plier leg. In such an embodiment, the stop section accordingly interacts with essentially the same or an adjacent region of the first plier leg as the contacting outer section of the locking part in the locking position. This back of the plier leg, which serves for supporting the locking part in the situation under load, preferably forms part of the altogether integral plier leg.

The stop region defining the open position of the pliers may also interact with this plier leg section.

In another preferred embodiment, the stop section is designed for interacting with a handle cover of the first plier leg. This preferably concerns an attached handle cover that is made of plastic and has a large wall thickness.

With respect to the disclosure, the ranges or value ranges or multiple ranges indicated above and below also include all intermediate values, particularly in $\frac{1}{10}$ increments of the respective dimension, but optionally also dimensionless. For example, the indication between 1.1-times and 1.5-times also includes the disclosure of between 1.2-times and 1.5-times, 1.1-times and 1.4-times, 1.2-times and 1.4-times, etc. The respective disclosure may on the one hand serve for defining a lower and/or upper limit of a cited range, but alternatively or additionally also for disclosing one or more singular values from a respectively indicated range.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings:

FIG. 1 shows a perspective representation of a pair of pliers in the closed position concerning a first embodiment;

FIG. 2 shows a partial representation of the pair of pliers in the form of a top view;

FIG. 3 shows an enlarged detail of the region III in FIG. 2 concerning a locking position of the pair of pliers, in which a locking part is used;

FIG. 4 shows the section along the line IV-IV in FIG. 3;

FIG. 5 shows the section along the line V-V in FIG. 4;

FIG. 6 shows an enlarged detail of the region VI in FIG. 5;

FIG. 7 shows a detail corresponding to FIG. 6 and concerning a position under load;

FIG. 8 shows a representation corresponding to FIG. 3 and concerning the unlocking position;

FIG. 9 shows the section along the line IX-IX in FIG. 8;

FIG. 10 shows the section along the line X-X in FIG. 9;

FIG. 16 shows a representation corresponding to FIG. 3 and concerning another embodiment in the unlocking position;

FIG. 17 shows a representation corresponding to FIG. 16 and concerning the locking position.

DESCRIPTION OF THE EMBODIMENTS

Figure 11:
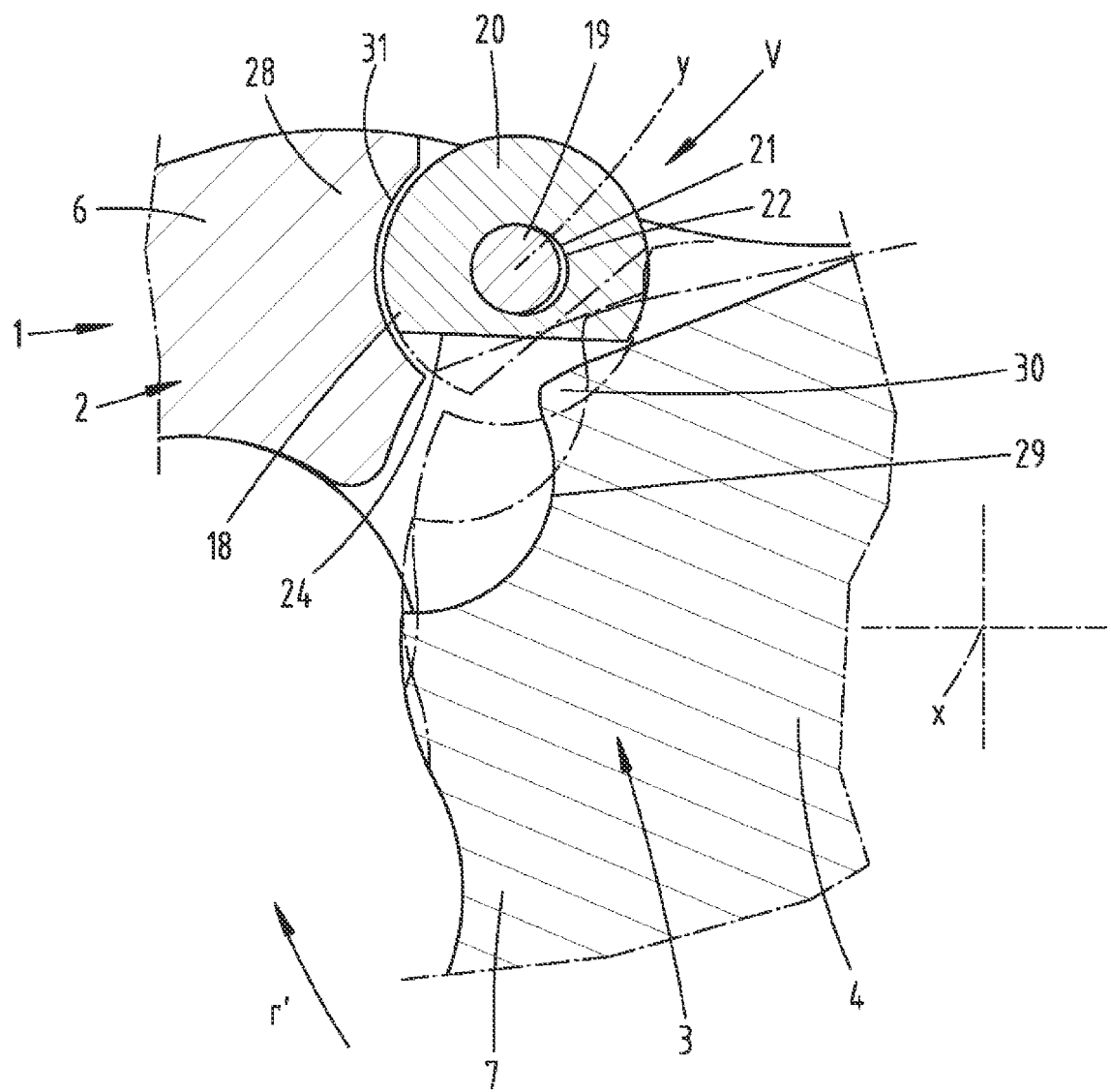
FIG. 11 corresponding to FIG. 5, in which the lock is activated in the usage position of the pair of pliers.

A pair of pliers 1 comprising two plier legs 2 and 3, which are only partially illustrated, e.g. in FIG. 2, is initially described with reference to FIG. 1, wherein said plier legs are mounted so as to be rotatable relative to one another about a geometric axis of rotation x in a joint region 4. The geometric axis of rotation x is defined by a joint pin 5 that extends through the plier legs 3 and 3 in the joint region 4.

The first plier leg 2 forms a gripping region 6 and the second plier leg 3 forms a gripping region 7 on one side of the joint region 4 whereas a plier jaw 8 is formed on the other side of the joint region 4.

According to the first exemplary embodiment illustrated in FIGS. 1 to 11, the plier jaw 8 specifically may have different functional regions that are formed behind one another, i.e. referred to a longitudinal line L-L. For example, a flat jaw region 9 may be formed on the side of the tip, i.e. on the free end of the plier legs 2 and 3.

The plier jaw 8 may have a cutting region 12 near the joint, wherein said cutting region has a first cutting edge 13 on the first plier leg 2 and a second cutting edge 14 on the second plier leg 3.

Figure 12:
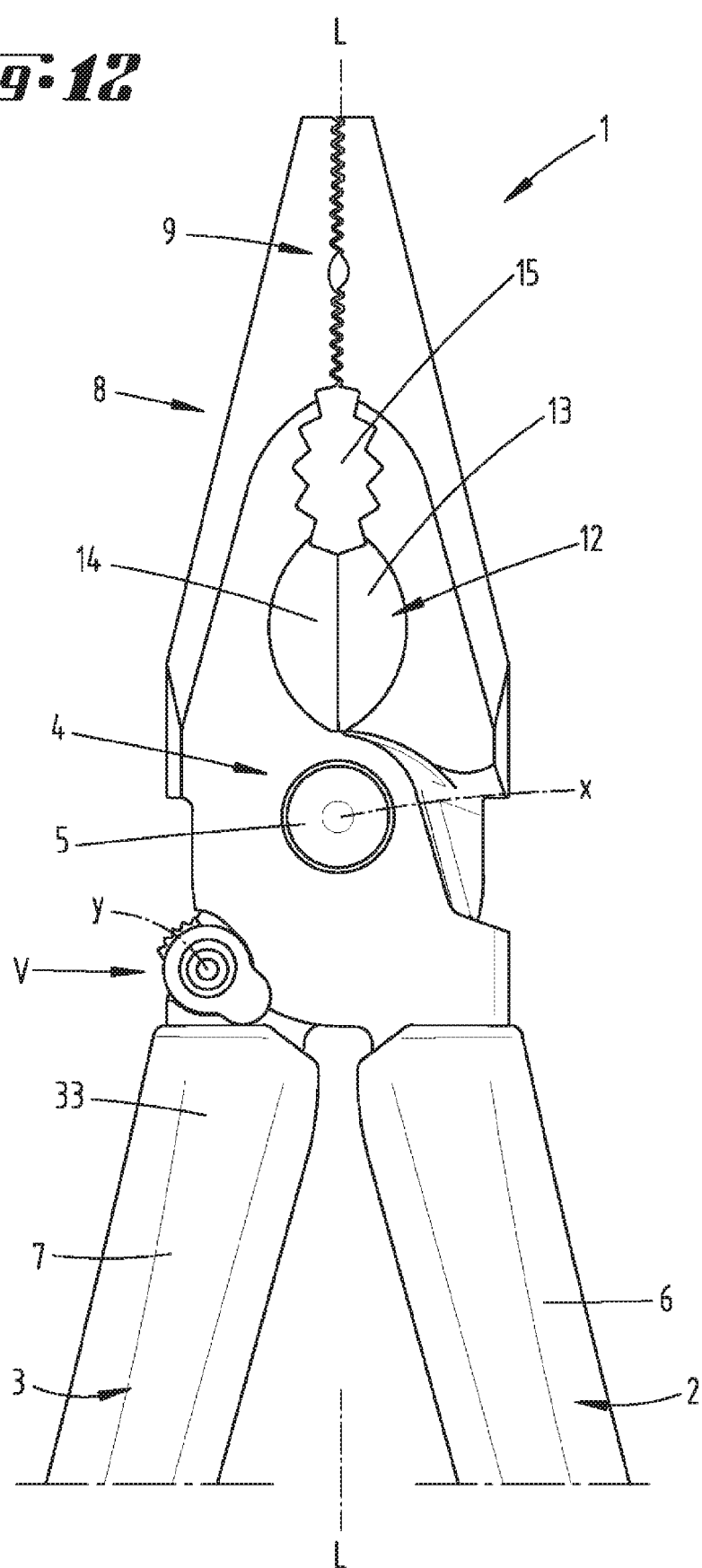
FIG. 12 shows a partial view of another embodiment of a pair of pliers concerning the closed position.

According to the first exemplary embodiment, a stripping region 10 may furthermore be provided between the cutting region 12 and the flat jaw region 9, wherein said stripping region comprises cutting formations 11 with different diameters in order to make it possible to strip wires with different cross sections. According to the illustrations in FIGS. 12 to 15, the pair of pliers 1 may also be realized in the form of so-called universal pliers, e.g. as illustrated in FIG. 12, wherein said universal pliers have a cutting region 12 and a flat jaw region 9, as well as a burner hole 15 formed between these regions.

Figure 13:
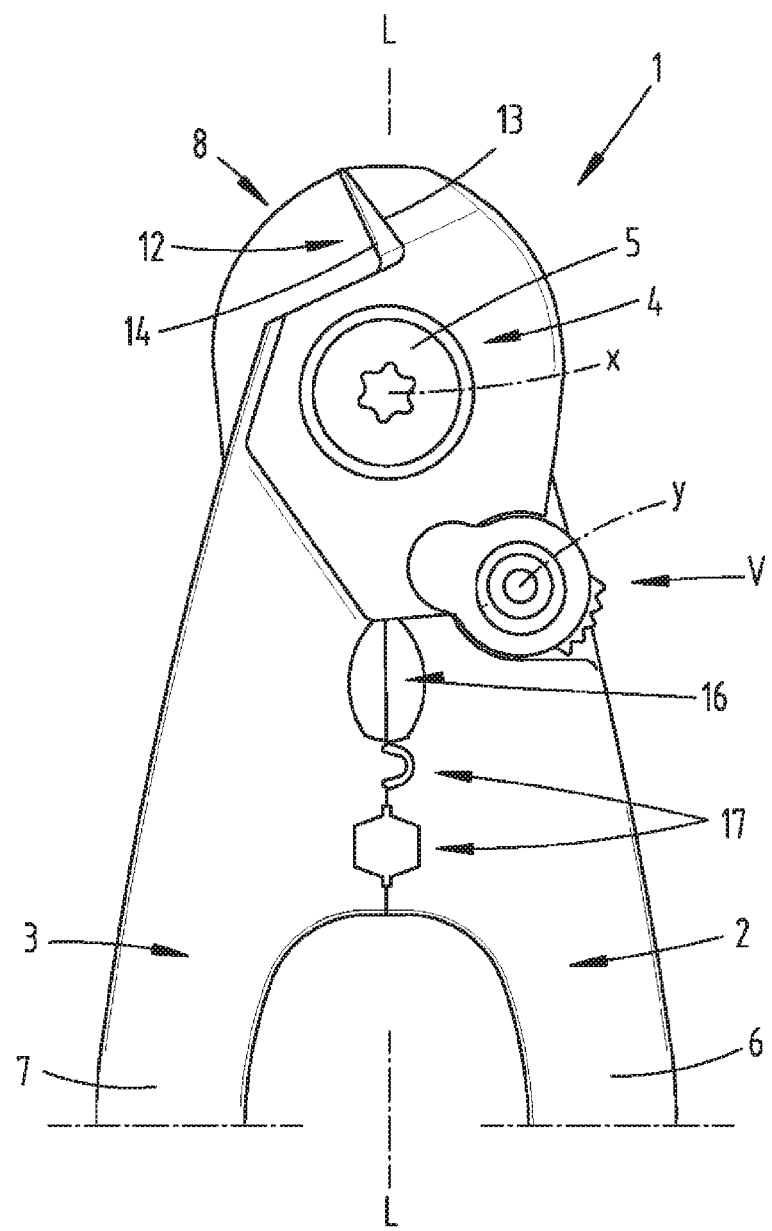
FIG. 13 shows another partial view of a third embodiment of a pair of pliers, which likewise concerns the closed position.

According to the illustration in FIG. 13, the pair of pliers 1 may also be realized in the form of a wire rope cutter with a first cutting region 12, which lies opposite of the gripping regions 6 and 7 referred to the axis of rotation x, and a second cutting region 16, which is formed between the gripping regions 6 and 7 near the joint. In this embodiment, multiple crimping regions, in this case two crimping regions 17, may furthermore be provided along the longitudinal axis L-L.

Figure 14:
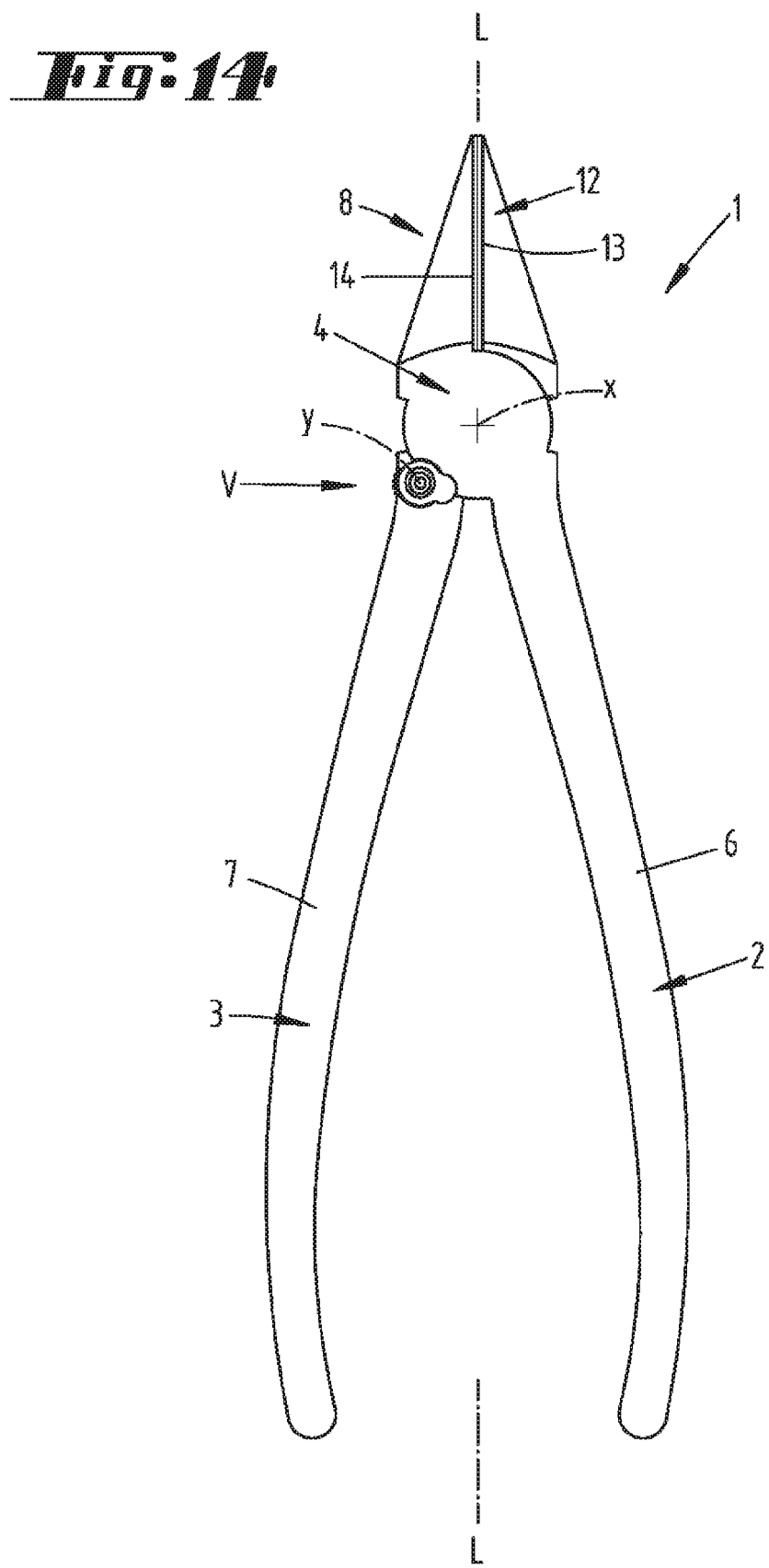
FIG. 14 shows a view of fourth embodiment of a pair of pliers in the closed position.

FIG. 14 shows a pair of pliers 1 in the form of cutting pliers, which accordingly comprise a cutting region 12.

Figure 15:
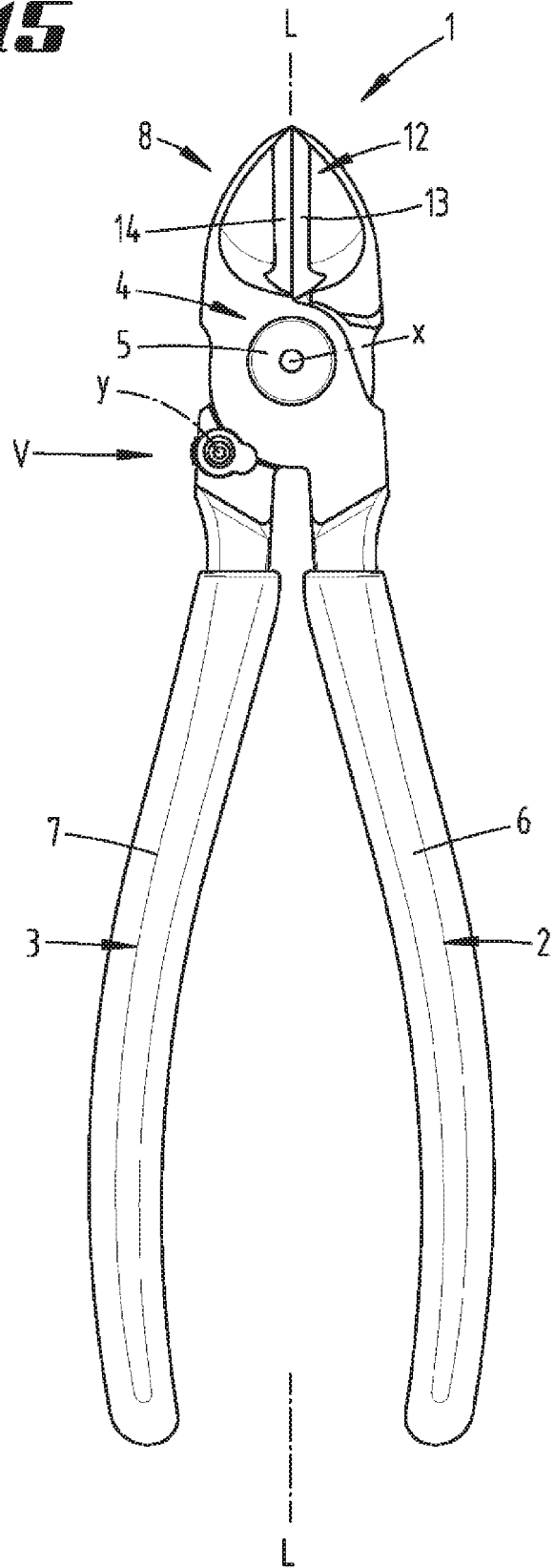
FIG. 15 shows a view of another pair of pliers according to a fifth embodiment concerning the closed position.

A pair of pliers 1 in the form of side cutters is illustrated in FIG. 15.

Furthermore, the pair of pliers 1 may also be realized in the form of any gripping pliers, center or front cutting pliers, stripping pliers, cable pliers, crimping pliers or also stripping pliers. The pair of pliers 1 particularly may be realized in the form of pliers or shears, in which the plier legs 2 and 3 overlap in the joint regions 4 in any pivoting position of the plier legs.

A position of the pliers, in the exemplary embodiment shown the closed position according to FIG. 1, can be fixed by means of a locking part V.

The locking part V is rotatably mounted on the first plier leg 2 in a transition region 18 from its gripping region 6 to the joint region 4. The geometric pivoting axis y of the locking part V is oriented in the same direction as the axis of rotation x.

A pin 19 is fastened on the first plier leg 2 in the transition region 18, wherein said pin has a longitudinal axis that essentially forms the pivoting axis y. The pin 19 extends from the first plier leg 2 or its transition region 18 beyond the surface facing the other plier leg 3.

In the embodiments illustrated in FIGS. 1 to 15, the pin 19 carries the locking part V that is altogether realized in an essentially pot-shaped manner and extends through the pot base 20 in the region of an oblong hole 21 formed at this location. The oblong hole 21 forms a rotary receptacle 22 for the pin 19.

The oblong hole 21 has a width dimension b that essentially corresponds to the diameter dimension d of the pin 19. The maximum clear length dimension c measured transverse to the width b of the oblong hole 21 approximately corresponds to between 1.1-times and 1.2-times the pin diameter d.

According to the oblong hole design of the rotary receptacle 22, the locking part V as a whole can be displaced in a sliding manner relative to the pin 19 extending through the pot base 20 perpendicular to the pivoting axis y by the differential dimension between the length c and the diameter d relative to the pin 19.

The pot-shaped locking part V has a pot wall 23 that stands on the pot base 20, wherein said pot wall is realized integrally with and made of the same material as the pot base 20. With respect to a top view according to the illustrations, e.g., in FIGS. 6 and 7, this pot wall, as well as the pot base 20, is essentially circular with a flattening 24 that extends in a secant-like manner. A flat side extending along the secant and in the direction of the pot base thickness is thereby formed in the region of the pot base 20. In the region of the pot wall 23, the flattening 24 transforms into a window-like recess 25 (also compare to FIG. 9).

FIG. 9 also shows that the recess 25 extends in a potential embodiment beyond the thickness of the facing joint region 4 of the second plier leg 3 viewed in the direction of the axis of rotation x.

According to the exemplary embodiment shown, the locking part V axially extends beyond the facing joint region 4 of the second plier leg 3, wherein the pot wall 23 is in this respect realized such that it essentially extends annularly over the entire circumference above the recess 25.

In the exemplary embodiment shown, the pin 19 is seated in a correspondingly provided bore 26 in the transition region 18 of the first plier leg 2. In this case, the pin 19 may be seated by means of a press fit or alternatively screwed into a correspondingly provided threaded bore. The fastening may furthermore also be realized by means of a rivet.

The head 27 of the pin 19, which extends beyond the bore 26 and through the oblong hole 21 in the pot base 20, is arranged in the locking part V in a sunk manner, wherein this is realized in the exemplary embodiment shown by forming a saucer-shaped radial widening that respectively overlaps the rotary receptacle 22 or the oblong hole 21.

With respect to the locking position according to the sectional representation in FIG. 4, a shoulder 28 is integrally formed on the first plier leg 2 opposite of the section of the joint region 4 of the second plier leg 3 facing the locking part 4, wherein said shoulder is made of the same material as the plier leg 2 and in the exemplary embodiment shown forms part of its corresponding gripping region 6. With respect to a cross-sectional representation according to FIG. 4, the shoulder 28 extends at least approximately over the same height in the direction of the pivoting axis y as the section of the joint region 4 of the second plier leg 3 facing the locking part V.

The locking part V essentially extends with its pot wall 23 and the pot base 20 between the support region 30 in the joint region 4 of the second plier leg 3, which is recessed by means of a cutout 29, and the contact region 31 formed by the shoulder 28 in the first plier leg 2.

In the locking position according to the illustrations in FIGS. 1 to 6, as well as in the other exemplary embodiments in FIGS. 11 to 14, the locking part V is pivoted about its pivoting axis y in such a way that the support and contact regions 30, 31 nearly flank the outer surface of the locking part V (compare, for example, to FIG. 6) while a gap of a few tenths of a millimeter, e.g. between 1 and 8 tenths of a millimeter or approximately 5 tenths of a millimeter, remains between the outer surface of the locking part V and the facing surface of the support region 30 and the contact region 31, which in a top view is likewise formed along a section of a circular arc.

An attempt to open the plier jaw 8 in this locking position by displacing the second plier leg 3 relative to the first plier leg 2 (opening direction r) leads to a support of the support region 30 on the outer surface of the pot wall 23 of the locking part V and then, depending on the original orientation of the locking part V, optionally to a sliding displacement of the locking part V as a whole in the direction of the support region 31 of the shoulder in the first plier leg 2, wherein said sliding displacement is guided due to the interaction between the pin 19 and the oblong hole 21 and takes place until the locking part V is in supporting contact with this contact region 31 (compare to FIG. 7).

In such a supporting position, the pin 19 may be seated in an approximately central position referred to the longitudinal orientation of the oblong hole 21 such that the force, which acts upon the locking part V via the second plier leg 3 and its support region 30 during such an opening attempt, is exclusively transmitted into the contact region 31 of the first plier leg 2 via the pot-shaped locking part V. In FIG. 7, the force flow is schematically indicated with the lines a.

In this position, the pin 19 is relieved of any forces, particularly shearing forces, acting thereupon. The locking part V is in any case under load in supporting contact with the contact region 31 and therefore with the gripping region 6 of the first plier leg 2, as well as with the support region 30 and therefore with the joint region 4 of the second plier leg 3, in a plane extending perpendicular to the pivoting axis y of the locking part V.

The locking position preferably can be defined by a limit stop. To this end, the locking part V has a stop section 32, which extends above the region for the supporting contact in the exemplary embodiment shown. This stop section is essentially oriented radially with respect to the pivoting axis y and at least in the locking position directed toward the inner side of the handle.

The stop section 32 preferably extends almost directly above the facing outer surface of the second plier leg 3 in the joint region 4 in a plane viewed perpendicular to the pivoting axis y.

The stop section 32 is designed for interacting with the first plier leg 2, e.g. with a facing end face of the gripping region 6. However, the stop section 32 may also be designed for interacting with a facing end face of a handler cover 33 of the first plier leg 2, which covers the gripping region 6.

With respect to a top view according to FIG. 3, the locking part V may furthermore have an actuating region 34 that is raised relative to the outer surface of the pot wall 23 and arranged on the outer wall side diametrically opposite of the stop section 32. Accordingly, this actuating region is essentially directed toward the outer side of the handle.

The actuating region 34 has a structuring that allows an advantageous actuation of the locking part V. For example, the locking part V can be actuated with the thumb of the hand holding the pair of pliers 1. A one-hand operation can thereby be realized.

In the unlocking position according to the illustrations in FIGS. 8 to 10, the actuating region 34 may at the same time form a stop in interaction with the facing surface of the contact region 31 of the first plier leg 2.

In this unlocking position, the locking part V is pivoted about the pivoting axis y in such a way that the flattening 24 in the pot base 20, as well as the recess 25 in the pot wall 23, are oriented so as to face the support region 30 of the second plier leg 3, wherein this orientation generally makes it possible to pivot the support region 30 past the locking part V in order to open the plier jaw 8 and to freely move the plier legs 2 and 3 (see also dot-dashed pivoting positions of the second plier leg 3 in FIG. 10).

The proposed design and arrangement of the locking part V can also be used for pliers 1 that are equipped with a return spring, by means of which the plier legs 2 and 3 are pushed into an open position of the plier jaw. As a result of the spring force, the second plier leg 3 is in the closed and locked position of the pliers supported on the first plier leg 2 via the locking part V without the pin 19, which altogether serves for mounting the locking part V on the first plier leg 2, having to absorb any forces acting thereupon.

According to FIG. 11, in particular, the locking part V can also be transferred into the locking position in an open position of the pliers 1 without impairing the function thereof. The locking part V may be inadvertently transferred into the locking position while the pliers are in use.

When the second plier leg 3 is displaced from the open position of the pliers in the closing direction r', the locking part V is in this case displaced into the unlocking position according to FIG. 10 in a rotationally drawn manner due to the action of the support region 30 of the locking part V upon the flattening 24 on the side of the locking part. The second plier leg 3 remains freely rotatable.

The pliers are only locked in the desired manner due to an (intentional) rotational displacement of the locking part V into the locking position when the plier legs 2 and 3 are in the closed position of the pliers.

Figure 18:
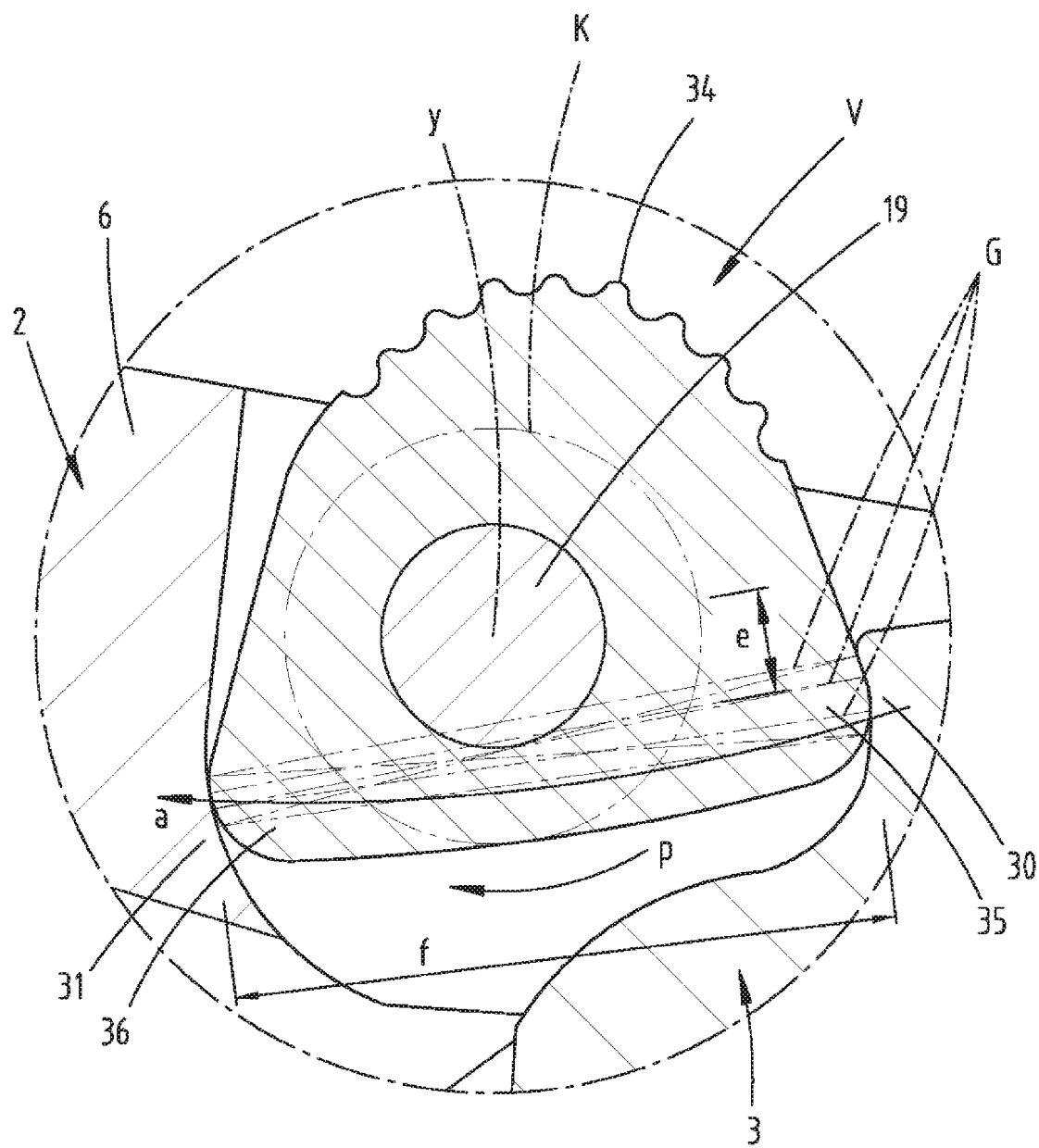
FIG. 18 shows the enlarged detail XVIII in FIG. 17 in the form of a sectional representation according to FIG. 7.

FIGS. 16 to 18 show an alternative embodiment of the locking part V, by means of which forces can be directly transmitted into the first plier leg 2 via the locking part V in the same way while accordingly not subjecting the pin 19 to a load.

In contrast to the above-described embodiment, the locking part V is in this case mounted on the pin 19 without clearance and has two cam-like projections 35 and 36, which in the locking position according to FIGS. 17 and 18 face the support region 30 and the contact region 31. These projections protrude beyond a circular line K referred to the pivoting axis y in the radial direction to the pivoting axis y, wherein the protruding dimension of the projection 35 facing the support region 30 beyond this circular line K may approximately corresponds to 2-times the protruding dimension of the projection 36 facing the contact region 31.

In this way, the second plier leg 3 can in the locking position be directly supported on the first plier leg 2 via the locking part V, wherein a force flow is exclusively achieved via the locking part V when the locking part V is correspondingly supported on the regions 30 and 31 by means of its projections 35 and 36 (see line a in FIG. 18).

Due to the arrangement and design of the projections 35 and 36 and/or the corresponding support and contact regions 30 and 31, a torque is in the locking position applied to the locking part V in the direction of the arrow p when a force is applied via the second plier leg 3 such that the projection 36 is turned into the contact position with the contact region 31 opposite to the rotating direction into the unlocking position.

The contact and support regions 30 and 31, which are in contact with the projections 35 and 36, can in the locking position be connected to one another by a series of straight lines G (see FIG. 18), wherein said straight lines G respectively extend at a radial distance e from the pivoting axis y. In this case, the radial distance e may approximately correspond to between one-tenth and one-fifth, e.g. approximately one-seventh, of the length f of the straight lines G between the contact points.

The preceding explanations serve for elucidating all inventions that are included in this application and respectively enhance the prior art independently with at least the following combinations of characteristics, wherein two, more or all of these combinations of characteristics may also be combined with one another, namely:

A pair of pliers, which is characterized in that the locking part V is in the fixed position and in any case under load in supporting contact with the joint region 4 of the second plier leg 3, as well as with the gripping region of the first plier leg 2, in a plane extending perpendicular to the axis of rotation x of the plier legs 2, 3.

A pair of pliers, which is characterized in that regions, in which the contact takes place, can only be connected by a straight line G that extends at a radial distance e from a geometric pivoting axis y of the locking part V.

A pair of pliers, which is characterized in that the locking part V is mounted on the pin 19 without clearance.

A pair of pliers, which is characterized in that the locking part V is rotatably mounted on the first plier leg 2 by means of a pin 19.

A pair of pliers, which is characterized in that a rotary receptacle 22 of the pin 19 is realized with an oversize that in the fixed position allows the aforementioned supporting contact.

A pair of pliers, which is characterized in that the rotary receptacle 22 is realized in the form of an oblong hole 21.

A pair of pliers, which is characterized in that a maximum clear length c of the oblong hole 21 corresponds to between 1.1-times and 1.5-times a maximum diameter dimension d of the pin 19.

A pair of pliers, which is characterized in that the pin 19 is formed on the first plier leg 2 and the rotary receptacle 22 is formed on the locking part V.

A pair of pliers, which is characterized in that the locking part V is in a cross section realized in a pot-shaped manner and the pin 19 extends through a pot base 20.

A pair of pliers, which is characterized in that a head 27 of the pin 19 is arranged in the locking part V in a sunk manner.

A pair of pliers, which is characterized in that the locking part V is with respect to its outer contour realized in an essentially circular manner in an axial region, in which it can come in supporting contact.

A pair of pliers, which is characterized in that the locking part V is provided with a flattening 24 in the region with a circular outer contour.

A pair of pliers, which is characterized in that the flattening 24 transforms into a recess 25 formed in the pot wall 23.

A pair of pliers, which is characterized in that the recess 25 is realized in the form of a window.

A pair of pliers, which is characterized in that the locking part V forms a stop section 32 that is directed toward the inner side of the handle and extends above the region of the supporting contact in the locking position.

A pair of pliers, which is characterized in that the stop section 32 is designed for limiting a rotation of the locking part V into the fixed position of the pliers 1.

A pair of pliers, which is characterized in that the stop section 32 is designed for interacting with the first plier leg 2.

A pair of pliers, which is characterized in that the stop section 32 is designed for interacting with a handle cover 33 of the first plier leg 2.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Pair of pliers
2 First plier leg
3 Second plier leg
4 Joint region
5 Joint pin
6 Gripping region
7 Gripping region
8 Plier jaw
9 Flat jaw region
10 Stripping region
11 Cutting formation
12 Cutting region
13 First cutting edge
14 Second cutting edge
15 Burner hole
16 Cutting region
17 Crimping region
18 Transition region
19 Pin
20 Pot base
21 Oblong hole
22 Rotary receptacle
23 Pot wall
24 Flattening
25 Recess 26 Bore
27 Head
28 Shoulder
29 Cutout
30 Support region
31 Contact region
32 Stop section
33 Handle cover
34 Actuating region
35 Projection
36 Projection
a Line
b Width
c Length
d Diameter
e Distance
f Length
p Arrow
r Opening direction
r' Closing direction
x Axis of rotation
y Pivoting axis
G Straight line
K Circular line
L Longitudinal line
Locking part

The invention claimed is:

1. A pair of pliers (1) comprising a first plier leg (2) and a second plier leg (3), which are mounted so as to be rotatable relative to one another about an axis of rotation (x) in a joint region (4), wherein said plier legs form gripping regions (6, 7) on one side of the joint region (4) and a plier jaw (8) on the other side, and comprising a locking part configured for fixing a position of the pliers (1), wherein the locking part (V) is rotatably mounted on the first plier leg (2) at a transition from the gripping region (6) to the joint region (4) of the first plier leg (2) and in a fixed position fixes the pliers (1) by contacting the joint region (4) of the second plier leg (3), and wherein the locking part (V), in the fixed position and under load, is in supporting contact with the joint region (4) of the second plier leg (3), as well as with the gripping region (6) of the first plier leg (2), in a plane extending perpendicular to the axis of rotation (x) of the plier legs (2, 3).

2. The pair of pliers according to claim 1, wherein the supporting contact takes place in regions that can only be connected by a straight line (G) that extends at a radial distance (e) from a geometric pivoting axis (y) of the locking part (V) and/or wherein the locking part (V) is mounted on a pin (19) without clearance.

3. The pair of pliers according to claim 1, wherein the locking part (V) is rotatably mounted on the first plier leg (2) by means of a pin (19).

4. The pair of pliers according to claim 3, wherein a rotary receptacle (22) of the pin (19) is formed with an oversize that in the fixed position allows the supporting contact.

5. The pair of pliers according to claim 4, wherein the rotary receptacle (22) is in the form of an oblong hole (21) and/or wherein a maximum clear length (c) of the oblong hole (21) corresponds to between 1.1-times and 1.5-times a maximum diameter dimension (d) of the pin (19).

6. The pair of pliers according to claim 4, wherein the pin (19) is formed on the first plier leg (2) and the rotary receptacle (22) is formed on the locking part (V).

7. The pair of pliers according to claim 3, wherein the locking part (V) is pot-shaped in a cross section and the pin (19) extends through a pot base (20) and/or wherein a head (27) of the pin (19) is arranged in the locking part (V) in a sunk manner.

8. The pair of pliers according to claim 7, wherein an outer contour of the locking part (V) is realized in an essentially circular manner in an axial region, in which the locking part can come in supporting contact, and/or wherein the axial region of locking part (V) is provided with a flattening (24).

9. The pair of pliers according to claim 8, wherein the flattening (24) transforms into a recess (25) formed in a pot wall (23) and/or wherein the recess (25) is realized in the form of a window.

10. The pair of pliers according to claim 1, wherein the locking part (V) forms a stop section (32) that is directed toward an inner side of a handle and extends above a region of the supporting contact in a locking position and/or wherein the stop section (32) is designed for limiting a rotation of the locking part (V) into the fixed position of the pliers (1) and/or wherein the stop section (32) is designed for interacting with the first plier leg (2) and/or wherein the stop section (32) is designed for interacting with a handle cover (33) of the first plier leg (2).

* * * * *